July 17, 1934. T. H. HUNTER 1,966,503
MOTION PICTURE FILM AND METHOD OF PROJECTING THE SAME
Filed Sept. 27, 1929    2 Sheets-Sheet 1
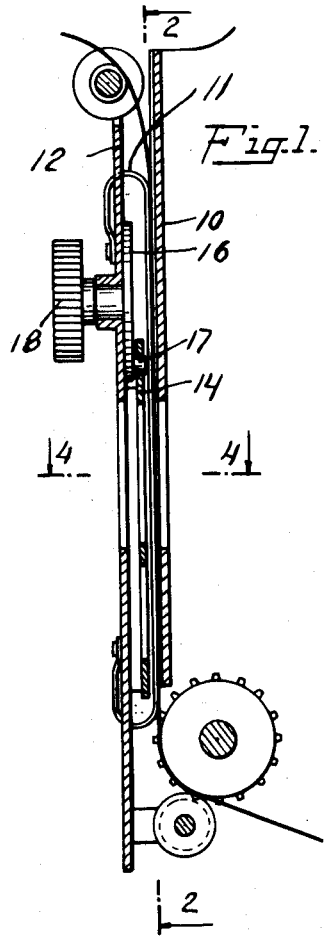
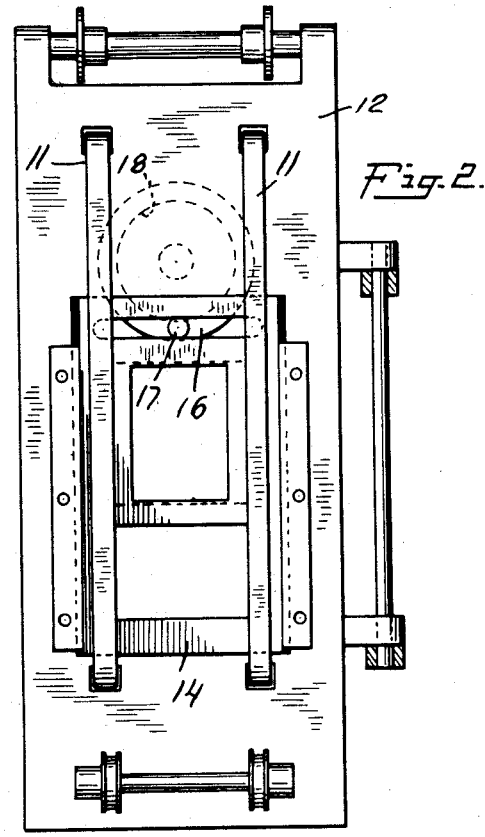
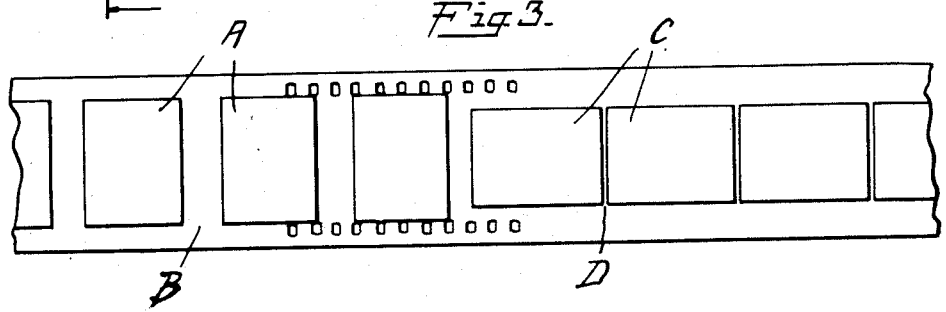
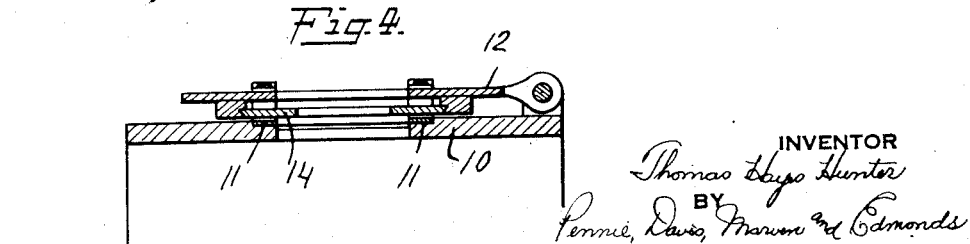
INVENTOR
Thomas Hays Hunter
BY
Pennie, Davis, Marvin and Edmonds
ATTORNEYS July 17, 1934.  T. H. HUNTER  1,966,503
MOTION PICTURE FILM AND METHOD OF PROJECTING THE SAME
Filed Sept. 27, 1929  2 Sheets-Sheet 2
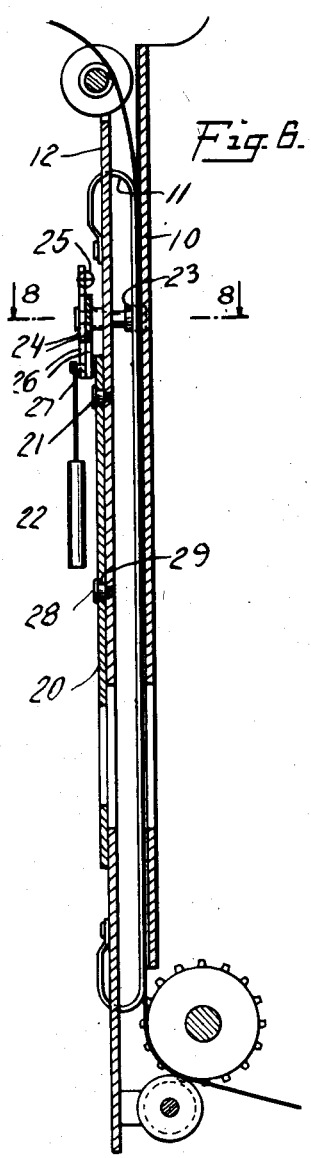
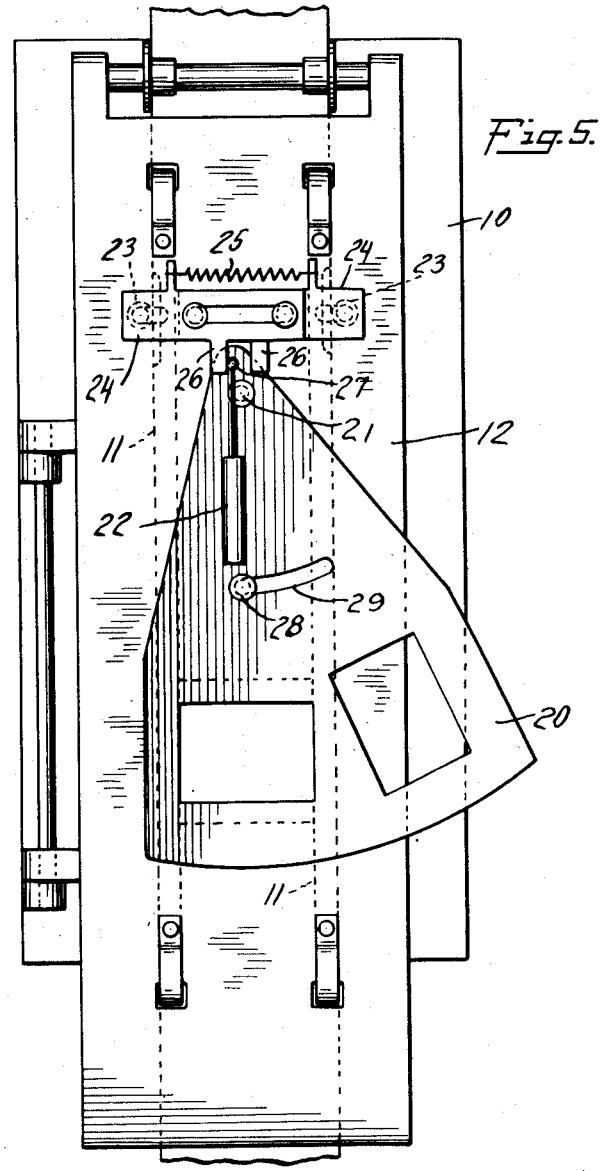
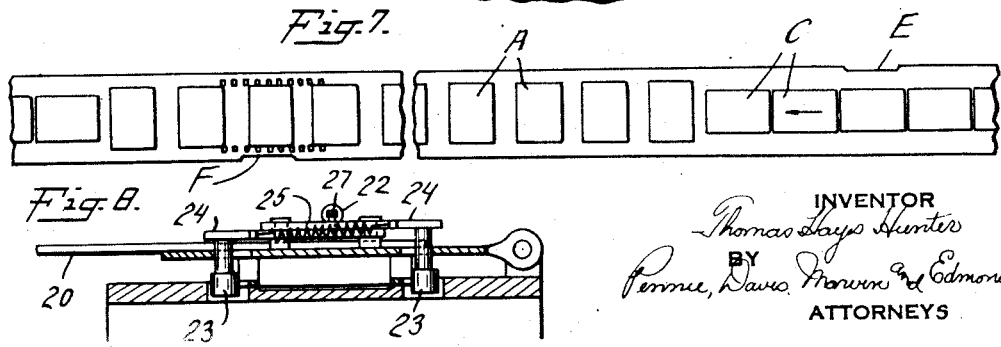
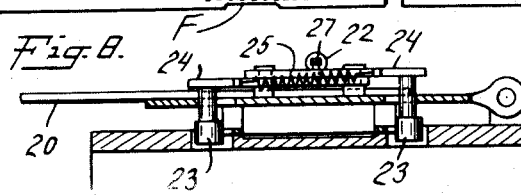
INVENTOR
Thomas Hays Hunter
BY
Pennie, Davis, Marvin and Edmonds
ATTORNEYS Patented July 17, 1934

1,966,503

UNITED STATES PATENT OFFICE 1,966,503

MOTION PICTURE FILM AND METHOD OF PROJECTING THE SAME

Thomas Hayes Hunter, Hollywood, Calif.

Application September 27, 1929, Serial No. 395,676

10 Claims. (Cl. 88—17)

This invention relates to motion picture films and method of projecting the same, and has for its object to provide a film wherein the shape of the picture is adapted to the character of the scene displayed.

At the present time, and in fact ever since the beginning of the motion picture industry, the individual pictures making up the motion picture film have been of a standard size and shape, substantially one inch by three-quarters of an inch, with the shorter dimension extending lengthwise of the film so that the projected pictures are wider than they are tall. This shape of picture is probably best adapted for the majority of scenes, particularly outdoor scenes, but it frequently happens that the essential figures in the object to be photographed extend more in a vertical direction than in a horizontal, and a better and more artistic showing could be made if the dimensions of the picture were reversed. This is particularly true of "close-ups" and interior views. Also, there are many outdoor scenes where it is desirable to show simultaneously objects separated by considerable vertical distances. In these cases it is necessary to take the picture at such a distance that much detail is lost, whereas if the picture could be taken and projected with the long dimension vertical, a much better effect would be produced.

The object of the present invention is to provide a motion picture film in which the pictures instead of being all arranged with their long dimension horizontal, are arranged on the film either in this manner or with the long axis vertical, according to the composition of the picture, the film, however, being adapted to be projected in the usual manner in a machine but slightly modified from the ordinary standard machine, as will be later described.

In the accompanying drawings I have illustrated my improved film and have also shown diagrammatically a view of the machine for projecting the pictures thereon.

In said drawings

Fig. 1 is a vertical sectional view of a gate for a motion picture machine equipped with a mechanism for exhibiting my novel film;

Fig. 2 is a sectional view on line 2—2 of Fig. 1;

Fig. 3 is a plan view showing my improved film;

Fig. 4 is a sectional view on line 4—4 of Fig. 1;

Fig. 5 is a rear elevation of a modified form of aperture mechanism;

Fig. 6 is a view similar to Fig. 1 showing a modified form of apparatus;

Fig. 7 is a plan view showing a modified form of film for use in the apparatus shown in Figs. 5 and 6; and Fig. 8 is a sectional view on line 8—8 of Fig. 6.

Referring particularly to Fig. 3, it will be noted that the film disclosed is of standard width but that some of the pictures A, while extending horizontally of the film as in the usual arrangement, are separated one from the other by wider opaque lines B than is ordinarily the case. The film also contains a series of pictures C of the same dimensions as the pictures A, but arranged with the long axis of the pictures extending longitudinally of the film. The pictures C are separated one from the other by narrow lines D and on each side of the picture there is an opaque portion of the film between the picture and the marginal sprocket holes. The individual pictures of both series have their centers equidistant from the centers of the adjacent pictures and the same number of sprocket holes are provided for each picture whether horizontal or vertical, so that in the operation of the machine the centers of the pictures will be brought successively in line with the optical axis of the projector, regardless of whether the pictures are horizontal or vertical.

In using film of the character described it is necessary to modify the projector only to the extent of slightly increasing the size of the sprockets so as to feed the film substantially one inch instead of three-quarters at each operation, and to change the shape of the projection aperture from the present rectangular shape to square, so that it will be tall enough for the vertical pictures and also wide enough for the horizontal pictures. If the film is sufficiently opaque in the marginal portions alongside the vertical pictures and in the wide division lines between the horizontal pictures, no other change is needed in the machine, but it is desirable to cut off the light entirely from the margins of the screen around the illuminated area forming the picture by a denser material than the silver salt deposit in the opaque portions of the photographic film. It is for this reason that the aperture plate of the usual projecting machine is cut to the exact size and shape of the picture to be projected.

It is therefore desirable to modify the projecting machines to provide a plate with a vertical aperture for vertical pictures and a horizontal aperture for horizontal pictures. This may of course be accomplished in a variety of ways. As illustrated in Figs. 1 and 2, the middle part of the ordinary aperture plate 10 against which the film is held by the guide shoes 11 on the gate 12, is cut away between the tracks which guide the perforated margin of the film and a movable mask or supplemental aperture plate 14 is mounted behind the gate 12 to lie in close proximity to the film. This movable plate 14 is provided with two apertures, one vertical and one horizontal, so that by shifting the plate up or down one aperture or the other will be brought into line with the optical axis of the machine. The shifting of the aperture plate may be accomplished in any desired manner, either by hand or automatically by the film itself in its passage through the machine. For example, the mask may be operated by hand by means of a crank disk 16 attached to the gate above the aperture in the manner shown. The crank pin 17 engages a horizontal slot in the movable mask 14 so that a half turn of the knurled disk 18 on the outside of the gate will shift the mask from one position to the other.

For shifting the mask through the action of the film I have illustrated a trip mechanism operated by notches cut in the opposite sides of the film adjacent to the vertical and horizontal pictures, respectively. As shown in Fig. 7, a notch E is cut in the left hand side of the film at the beginning of each series of vertical pictures, while in advance of each series of horizontal pictures is a notch F cut in the right hand side of the film. In the machine for projecting this film shown in Figs. 5, 6 and 8, the mask 20 with the two differently shaped apertures is mounted on a pivot 21 above the optical axis of the machine and is provided with a light counterweight 22 to hold it in either of its operative positions.

Supported adjacent the path of movement of the film on each side thereof so as to engage the edges of the film are rollers 23 mounted on slide bars 24 so as to be held against the edges of the film by a suitable spring 25. The edges of the bars 24 which overlie the pivot of the mask 20 are provided with projections 26 lying on each side of a pin 27 carried by an upward extension of the pivoted mask. A pin 28 on the gate projecting through a slot 29 in the mask limits the movement of the mask from one operative position to the other.

The operation of the device will be clear from the above description. As the film moves through the machine the two rollers 23 engage the opposite edges of the film and as long as neither of the side notches passes in contact with the rollers the mask will remain stationary in whatever position it was last adjusted to. If we assume that the mask has last been adjusted for the showing of horizontal pictures the pin 28 will lie at the left end of the slot 29 and the pin 27 will be adjacent the projection 26 on the slide 24 which engages the left side of the film.

If, now, a series of vertical pictures is to be shown the notch E in the left hand margin of the film will engage the roller 23 on that side of the machine, allowing the spring 25 to shift the slide 24 on that side of the machine toward the right as shown in Fig. 5, thereby shifting the shutter to the left sufficiently for the weight 22 to complete the movement of the mask until the other end of the slot 29 contacts with the stop pin 28. This shifts the pin 27 into a position adjacent the projection 26 on the slide 24 on the right side of the machine where it will remain until the notch F in the opposite side of the film shifts the mask back to its first described position.

The mechanism above described constitutes a simple and inexpensive adjunct of the ordinary motion picture machine, but the invention of this application is not limited to this apparatus or any particular apparatus, being directed to a film and a method of projection.

It will of course be understood that no greater light is required to project my improved pictures than the ordinary picture. The lenses and condensers employed in the projecting apparatus are necessarily circular and consequently the light is equally intense on all sides of the optical axis. In projecting all horizontal pictures a greater portion of the light above and below the picture is lost and while projecting the vertical pictures this portion of the light is utilized and the light at the side of the pictures is cut off. A slightly greater length of film is required and the length of film fed per interval of time is also increased. The machine, however, is not operated faster in the sense that it is given a greater number of intermittent operations per second, the only change necessary being an increase in the size of the feed sprockets. The ordinary feed sprocket has a circumference of three inches so that each quarter turn will be a single picture of a height of three-quarters of an inch. To project my improved film the circumference of the sprocket is increased to four inches so that each intermittent movement of the sprocket will feed one inch of film instead of three-quarters.

I have described my invention in connection with the ordinary moving picture film of standard dimensions, but it will of course be understood that the invention may be adapted to the so-called wide width film or to the small sized film used for amateur pictures or to any other size or type of film. For example the invention may be employed in connection with talking pictures wherein the sound record is carried on the film.

It will also be understood that other mechanism not described may be employed for modifying the action of the projector for the two different sizes of pictures. For example the pictures may be arranged with their edges the same distance apart instead of their centers, and the amplitude of the intermittent movement alternated to suit the different series of pictures. Other modifications of the invention may be made within the scope of the appended claims.

I claim:

1. A motion picture film having successive picture-bearing portions of oblong configuration, the oblong areas constituting said picture-bearing surfaces being arranged throughout a portion of the length of the film with the long axes of the oblongs parallel with the side edges of the film and throughout another portion of the length of the film with the short axes of the oblongs parallel with the side edges of the film, and the picture images in said areas running in the same direction throughout both area portions.

2. A motion picture film having successive picture-bearing portions of oblong configuration, the oblong areas constituting said picture-bearing surfaces being arranged throughout a portion of the length of the film with the long axes of the oblongs parallel with the side edges of the film and throughout another portion of the length of the film with the short axes of the oblongs parallel with the side edges of the film, the picture-bearing areas of both series being spaced on the film strip with their centers spaced apart the same distance, and the picture images in said areas running in the same direction throughout both area portions.

3. A motion picture film having successive picture-bearing portions of oblong configuration, the oblong areas constituting said picture-bearing surfaces being arranged throughout a portion of the length of the film with the long axes of the oblongs parallel with the side edges of the film and throughout another portion of the length of the film with the short axes of the oblongs parallel with the side edges of the film, the picture images in said areas running in the same direction throughout both area portions, and the said film having notches formed thereon at the points where one series of pictures ends and another begins.

4. In a motion picture projecting machine, film guides, a mask supported closely adjacent said guides for defining the illuminated area of the film, said film having portions of its picture-bearing areas arranged with the long axis of the oblongs parallel with the side edges of the film and throughout another portion of the length of the film a short axis of the oblongs parallel with the side edges of the film, said mask having apertures of shapes corresponding to the shapes of the picture areas, and means controlled by the film for shifting said mask to bring the appropriate apertures in line with the optical axis of the machine whenever the image areas of the film change from one series portion to the other.

5. A unitary motion picture film having successive picture-bearing portions of oblong configurations, a series of said picture-bearing portions arranged with the long axis of the oblongs parallel with the side edges of the film, another series of picture-bearing portions with the short axis of the oblongs parallel with the side edges of the film, the picture-bearing areas of both series being spaced on the film strip with their centers spaced apart the same distance, the picture images of both series running in the same direction, and said film having shoulders formed thereon at the points where one series of pictures ends and another begins.

6. A unitary motion picture film having successive picture-bearing portions of oblong configurations, a series of said picture-bearing portions arranged with the long axis of the oblongs parallel with the side edges of the film, another series of picture-bearing portions with the short axis of the oblongs parallel with the side edges of the film, the picture-bearing areas of both series being spaced on the film strip with their centers spaced apart the same distance, the picture images of both series running in the same direction, and said film having notches formed thereon at the points where one series of pictures ends and another begins.

7. A motion picture film having successive picture-bearing portions of oblong configurations, the oblong areas constituting said picture-bearing surface being arranged throughout a portion of the length of the film with the long axis of the oblongs parallel with the side edges of the film, and throughout another portion of the length of the film with the short axis of the oblongs parallel with the side edges of the film, and pictures running longitudinal of the film throughout both area portions.

8. A motion picture film having successive picture-bearing portions of oblong configurations, the oblong areas constituting said picture-bearing surface being arranged throughout a portion of the length of the film with the long axis of the oblongs parallel with the side edges of the film, and throughout another portion of the length of the film with the short axis of the oblongs parallel with the side edges of the film, and pictures running transverse of the film throughout both area portions.

9. In a motion picture projecting machine, film guides, a mask supported closely adjacent said guides for defining the illuminated area of the film, said film having portions of its picture-bearing areas of different shapes, said mask having apertures of shapes corresponding to the shapes of the picture areas, and means controlled by the film for shifting said mask to bring the appropriate apertures in line with the optical axis of the machine whenever the image areas of the film change from one shape to the other.

10. In a motion picture projecting machine, film guides, a mask supported closely adjacent said guides for defining the illuminated area of the film, said film having portions of its picture-bearing areas of different sizes, said mask having apertures of shapes corresponding to the size of the picture areas, and means controlled by the film for shifting said mask to bring the appropriate apertures in line with the optical axis of the machine whenever the image areas of the film change from one size to the other.

THOMAS HAYES HUNTER.